United States Patent
Shiina et al.

(10) Patent No.: US 12,494,079 B2
(45) Date of Patent: Dec. 9, 2025

(54) IMAGING APPARATUS AND IMAGING METHOD

(71) Applicant: FUJITSU FRONTECH LIMITED, Tokyo (JP)

(72) Inventors: Yusuke Shiina, Inagi (JP); Yuki Hasegawa, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 217 days.

(21) Appl. No.: 18/231,539

(22) Filed: Aug. 8, 2023

(65) Prior Publication Data
US 2023/0410548 A1 Dec. 21, 2023

Related U.S. Application Data

(63) Continuation of application No. PCT/JP2021/006508, filed on Feb. 19, 2021.

(51) Int. Cl.
*G06V 10/141* (2022.01)
*G06V 10/74* (2022.01)
*G06V 40/10* (2022.01)
*H04N 23/67* (2023.01)

(52) U.S. Cl.
CPC .......... *G06V 40/11* (2022.01); *G06V 10/141* (2022.01); *G06V 10/761* (2022.01); *H04N 23/67* (2023.01)

(58) Field of Classification Search
CPC .... G06V 40/11; G06V 10/141; G06V 10/761; G06V 40/1312; G06V 40/14; H04N 23/67; H04N 23/55; H04N 23/56; A61B 5/1171
USPC ........................................................ 382/115
See application file for complete search history.

(56) References Cited

U.S. PATENT DOCUMENTS

2014/0247373 A1 * 9/2014 Harple ............... H04N 23/45
348/222.1

FOREIGN PATENT DOCUMENTS

| JP | S63-133014 A | 6/1988 |
| JP | 2007-328571 A | 12/2007 |
| JP | 2008-242617 A | 10/2008 |
| JP | 2010-220035 A | 9/2010 |
| JP | 2014-78857 | 5/2014 |
| JP | 2015-14909 A | 1/2015 |

OTHER PUBLICATIONS

International Search Report dated May 25, 2021 for International Application No. PCT/JP2021/006508.
JP-Office Action dated Oct. 15, 2024 in the corresponding Japanese patent application No. 2023-500474.
Japanese Office Action dated Oct. 14, 2025 for corresponding Japanese Application No. 2025-005801.

* cited by examiner

*Primary Examiner* — Stephen P Coleman
(74) *Attorney, Agent, or Firm* — STAAS & HALSEY LLP (57) ABSTRACT

An imaging apparatus includes a light irradiating unit that irradiates light to a living body, a ranging unit that measures a distance to the living body, a plurality of lenses having respectively different focal lengths at which an image of a living body to which the light is irradiated is formed, an imaging device that generates a plurality of living body images that are images of the living body by respectively capturing an image of the living body through the lenses, and an image selecting unit that selects one out of the living body images based on the measured distance to the living body.

7 Claims, 6 Drawing Sheets

IMAGING APPARATUS AND IMAGING METHOD

CROSS-REFERENCE TO RELATED APPLICATION

This application is a continuation application of International Application PCT/JP2021/006508, filed on Feb. 19, 2021 and designating the U.S., the entire contents of which are incorporated herein by reference.

FIELD

The present disclosure relates to an imaging apparatus and an imaging method, and specifically relates to an imaging apparatus and an imaging method that generate an image of a living body.

BACKGROUND

In authentication apparatus that perform personal authentication, an imaging apparatus that captures a living body image, such as a vein image of a finger and an image of a fingerprint, has been used. For example, an imaging apparatus that includes an imaging device, a lens array in which plural lenses are arranged in an array, and an illumination means has been proposed (for example, refer to Patent Literature 1).

In this conventional technique, each of the lenses included in the lens array forms an image of a living body in the imaging device. This imaging device captures a compound eye image, which is a set of plural images of a living body. The imaging apparatus according to the conventional technique separates living body images respectively corresponding to the plural lenses from the acquired compound eye image. The separated living body images are images formed by lenses of different planar positions, and have an image shift. The imaging apparatus of the conventional technique generates a living body image from which an image shift is removed by performing arithmetic operations among these plural living body images. By using a part of this compound eye image, measurement of ambient illuminance or measurement of distance to a subject is performed. Based on this distance to a subject, an ON/OFF control of an illumination means and the like are performed. Moreover, in this imaging apparatus, imaging is started when a distance to a subject becomes a predetermined threshold or smaller.

Patent Literature 1: JP-A-2010-220035

However, in the conventional technique described above, because arithmetic operations of plural images are performed, there is a problem that a range of distance to a subject that can be imaged is narrow. Accordingly, it is necessary to bring a subject close to the imaging apparatus to perform imaging, and there is a problem that usability is reduced.

SUMMARY

According to an aspect of the embodiments, an imaging apparatus includes: a light irradiating unit that irradiates light to a living body; a ranging unit that measures a distance to the living body; a plurality of lenses having respectively different focal lengths at which an image of a living body to which the light is irradiated is formed; an imaging device that generates a plurality of living body images that are images of the living body by respectively capturing an image of the living body through the lenses; and an image selecting unit that selects one out of the living body images based on the measured distance to the living body.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Configuration of Authentication Apparatus

Figure 1:
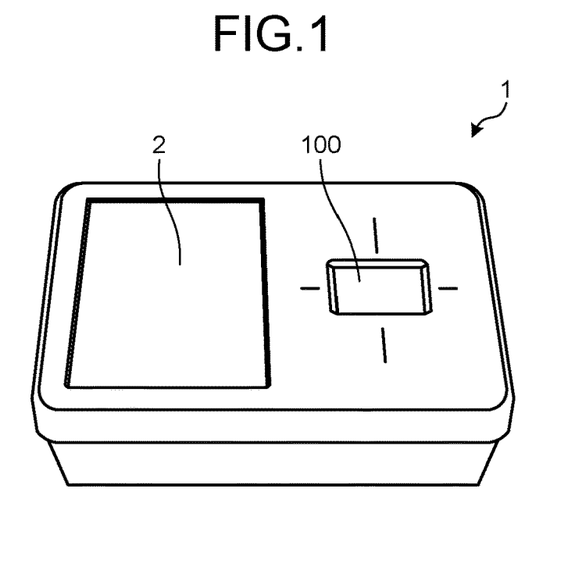
FIG. 1 is a diagram illustrating a configuration example of an authentication apparatus according to an embodiment of the present disclosure.

FIG. 1 is a diagram illustrating a configuration example of an authentication apparatus according to an embodiment of the present disclosure. The drawing is a diagram explaining an overview of an authentication apparatus 1. The authentication apparatus 1 is to perform biometric authentication by using biological information of a human body. Moreover, the authentication apparatus 1 in the drawing is an example of a stand-alone authentication apparatus. The biological information corresponds to, for example, vein, fingerprint, iris, shape of a face, and the like. The authentication apparatus 1 in the drawing is an example that uses vein of a palm of a person as the biological information.

The authentication apparatus 1 in the drawing is constituted of a panel 2 and an imaging apparatus 100 arranged in a casing. The panel 2 is a display panel to which a touch panel is added. This panel 2 is to perform input and output of information with a user. The imaging apparatus 100 is to generate a vein image of a palm of a user. This imaging apparatus 100 performs imaging of a vein image while irradiating an infrared light to a palm of a user.

When a palm is held over the imaging apparatus 100 in the drawing, an infrared light is irradiated to the palm from the imaging apparatus 100. A part of the irradiated infrared light is reflected on a surface of the palm, and the rest passes through the skin and cells of the palm to enter inside, and is absorbed by hemoglobin of blood in veins. That is, by irradiating the infrared light, a reflected light according to a shape of a vein can be obtained. As described later, the imaging apparatus 100 includes an imaging device (imaging device 10) corresponding to an infrared light. By imaging the reflected light from the palm by using this imaging device 10, a vein image that is an image of a vein pattern can be generated. As described, the authentication apparatus 1 acquires a vein image in a non-contact manner. Based on this vein image, the authentication apparatus 1 performs authentication.

Imaging Apparatus

Figure 2:
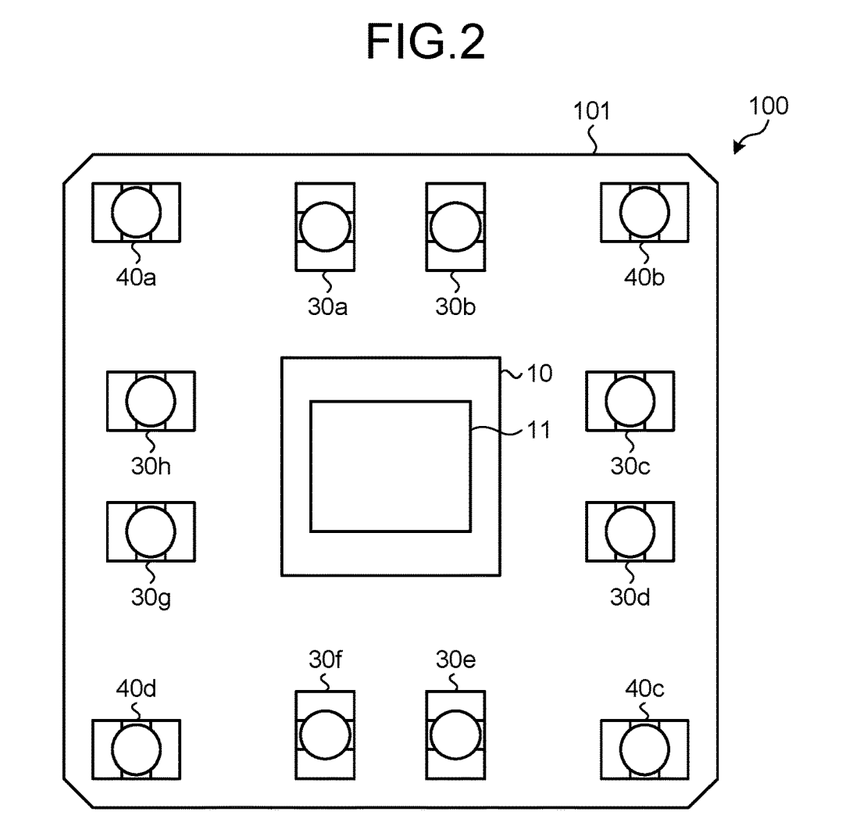
FIG. 2 is a diagram illustrating a configuration example of an imaging apparatus according to an embodiment of the present disclosure.

FIG. 2 is a diagram illustrating a configuration example of a imaging apparatus according to an embodiment of the present disclosure. This drawing is a plan view illustrating a configuration example of the imaging apparatus 100. In this imaging apparatus 100 in the drawing, the imaging device 10, a light irradiating unit 30 (light irradiating units 30*a*, 30*b*, 30*c*, 30*d*, 30*e*, 30*f*, 30*g*, and 30*h*) and a ranging-light irradiating unit 40 (ranging-light irradiating units 40*a*, 40*b*, 40*c*, and 40*d*) are arranged on a surface of a substrate 101.

The light irradiating units 30*a* to 30*h* are to irradiate light to a living body when imaging is performed. This light irradiating units 30*a* to 30*h* can be constituted of a light emitting diode (LED) that irradiates an infrared light. As illustrated in the drawing, the light irradiating units 30*a* to 30*h* can be arranged around the imaging device 10.

The ranging-light irradiating units 40*a* to 40*d* are to irradiate light to be used for measuring a distance to a living body (hereinafter, referred to as ranging light) to the living body. The ranging-light irradiating units 40*a* to 40*d* can be constituted of an LED that irradiates an infrared light. The ranging-light irradiating units 40*a* to 40*d* differ from the light irradiating units 30*a* to 30*h* in a point in that it condenses the emission light. As illustrated in the drawing, the ranging-light irradiating units 40*a* to 40*d* can be arranged at four corners of the substrate 101.

The imaging device 10 is to generate a living body image. This imaging device 10 includes a light receiving surface 11 that is an area in which plural pixels converting light into an electrical signal are arranged. The imaging device 10 performs imaging of light that enters this light receiving surface 11. The imaging device 10 in the drawing performs imaging of light that is irradiated from the light irradiating units 30*a* to 30*h* and is reflected on a living body, to generate a living body image. As illustrated in the drawing, the imaging device 10 is arranged at a central part of the substrate 101. For the imaging device 10, for example, a complementary metal oxide semiconductor (CMOS) or a charge coupled device (CCD) imaging device can be used.

Imaging of Living Body Image

Figure 3:
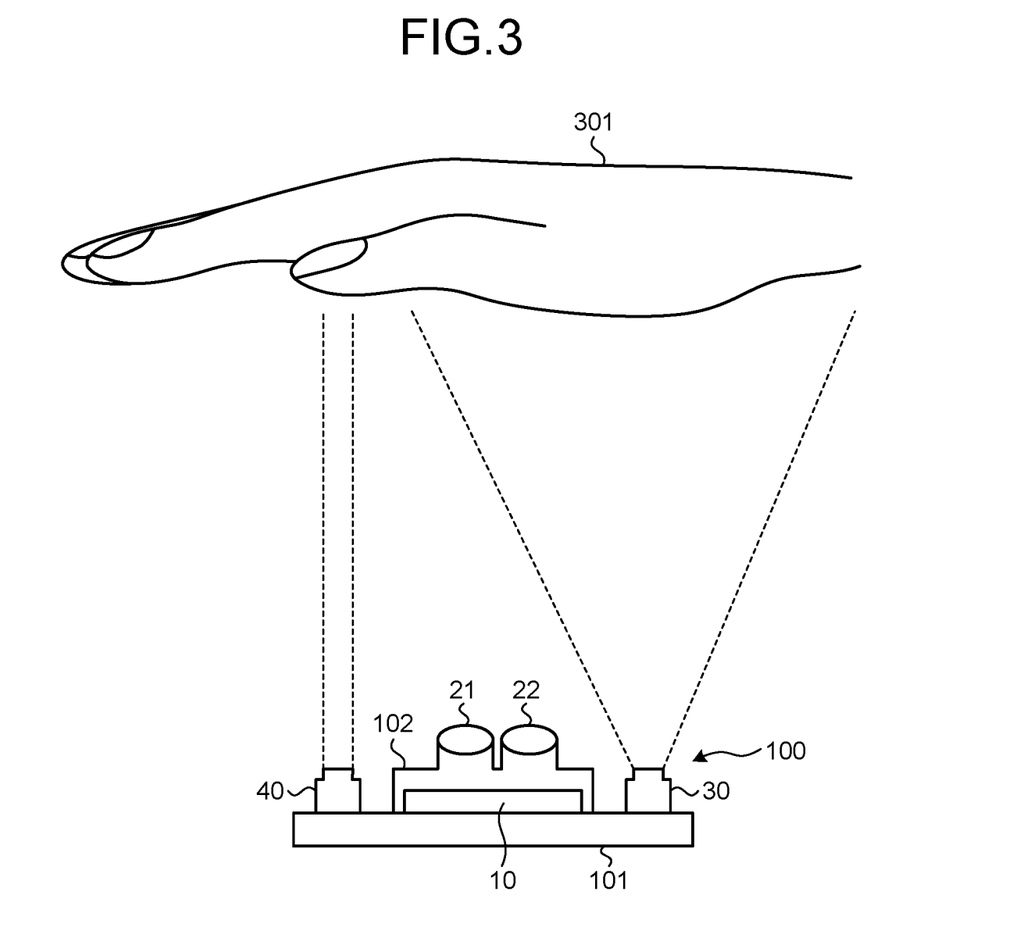
FIG. 3 is a diagram illustrating an example of imaging of a living body image according to an embodiment of the present disclosure.

FIG. 3 is a diagram illustrating an example of imaging of a living body image according to an embodiment of the present disclosure. The drawing is a schematic diagram illustrating an example of imaging of a living body image by the imaging apparatus 100. Moreover, the drawing illustrates a state in which a hand 301 is held over the imaging apparatus 100. A dotted line in the drawing represents an infrared light to be irradiated to a palm of the hand 301. As illustrated in the drawing, the light irradiating unit 30 irradiates light in a shape diffusing in a wide range. On the other hand, the ranging-light irradiating unit 40 includes a lens to gather incident light from the LED, and irradiates light concentrated at one point on the hand 301. The light irradiated by this ranging-light irradiating unit 40 corresponds to ranging light. In the imaging apparatus 100 in the drawing, lenses (first lens 21 and second lens 22) that gather reflected light from the hand 301 are described. These lenses can be arranged in a cover 102 (not illustrated in FIG. 2) that covers the imaging device 10.

Imaging of Authentication Apparatus

Figure 4:
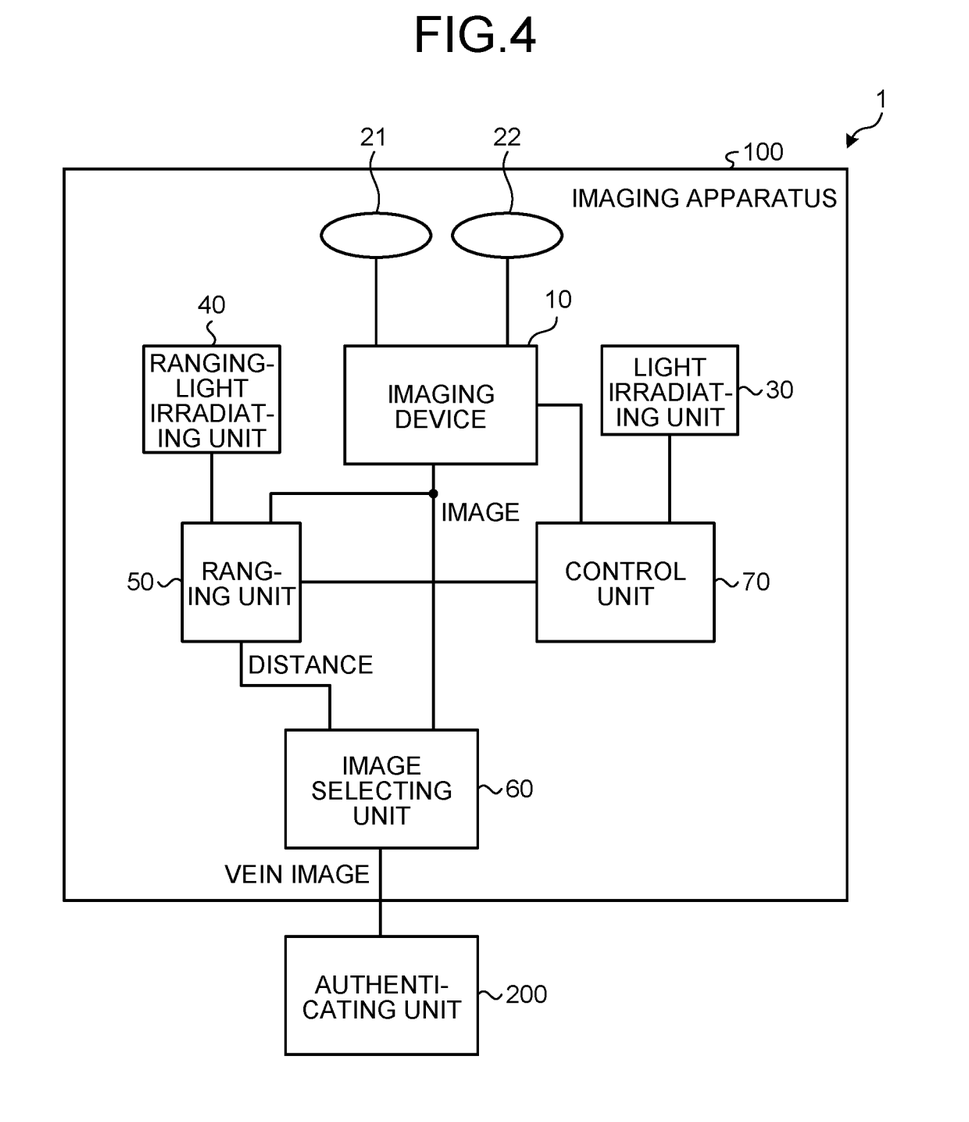
FIG. 4 is a diagram illustrating a configuration example of an authentication apparatus according to an embodiment of the present disclosure.

FIG. 4 is a diagram illustrating a configuration example of an authentication apparatus according to an embodiment of the present disclosure. The drawing is a block diagram showing a configuration example of the authentication apparatus 1. The authentication apparatus 1 in the drawing includes the imaging apparatus 100 and an authenticating unit 200.

The imaging apparatus 100 is to generate a living body image by performing imaging of a living body as described previously. The imaging apparatus 100 in the drawing captures an image of a hand (palm), which is a living body, and generates a vein image, which is a living body image, to output it.

The imaging apparatus 100 includes the imaging device 10, the first lens 21, the second lens 22, the light irradiating unit 30, the ranging-light irradiating unit 40, a ranging unit 50, an image selecting unit 60, and a control unit 70.

The light irradiating unit 30 is to irradiate light to a living body as described previously. The light irradiating unit 30 in the drawing irradiates an infrared light to a hand, which is a living body. Moreover, the light irradiating unit 30 performs irradiation of light based on a control of the control unit 70.

The first lens 21 is to form an image by gathering light from a living body. The first lens 21 in the drawing forms a living body image on (the light receiving surface 11 of) the imaging device 10 by gathering the reflected light that is irradiated from the light irradiating unit 30 and reflected on a living body (palm).

The second lens 22 is to form an image by gathering light from a living body, similarly to the first lens 21. The second lens 22 in the drawing also forms a living body image on (the light receiving surface 11 of) the imaging device 10 by gathering reflected light that is irradiated from the light irradiating unit 30 and reflected on a living body (palm).

The first lens 21 and the second lens 22 have different focal lengths. Specifically, the first lens 21 is configured to have a shorter focal length than the second lens 22. Therefore, the first lens 21 and the second lens 22 differ in position and range in which the living body, which is a subject, is focused. The range of focus is a region close to the imaging device 10 for the first lens 21, and is a region farther than the first lens 21 for the second lens 22. The first lens 21 and the second lens 22 form an image of the living body on the imaging device 10 at the same time. Moreover, the first lens 21 and the second lens 22 in the drawing are arranged side by side relative to the light receiving surface 11. Therefore, on the imaging device 10, living body images are formed by the first lens 21 and the second lens 22, respectively.

Imaging of a living body image is necessary to be performed under a condition that at least one of the first lens 21 and the second lens 22 is focused. This is because an out-of-focus unclear living body image affects authentication. A range of distance to a living body in which a living body image captured through the first lens 21 and the second lens 22 is applicable to authentication is substantially equal to a range in which the first lens 21 and the second lens 22 are focused. Because ranges in which the first lens 21 and the second lens 22 are focused differ from each other, distances to the living body enabling authentication when living body images captured through the first lens 21 and the second lens 22 are used also differ from each other. As described later, for the first lens 21 and the second lens 22, lenses having focal lengths with which ranges of distance to a living body enabling authentication by living body images captured through the respective lenses partially overlap each other are adopted.

The imaging device 10 is to generate a living body image as described previously. The imaging device 10 in the drawing generates a vein image. To the imaging device 10 in the drawing, reflected light that is emitted from the light irradiating unit 30 and reflected on a hand, which is a living body, enters. With this reflected light, the imaging device 10 performs imaging of veins of the hand. As described above, on the imaging device 10, the first lens 21 and the second lens 22 arranged side by side form a living body image. Therefore, the imaging device 10 generates two images including the living body images corresponding to the respective lenses. The image generated by the imaging device 10 is output to the image selecting unit 60.

Moreover, the imaging device 10 further generates an image for ranging to measure a distance to the living body. This image is an image that is generated by imaging an image of light that is irradiated by the ranging-light irradiating unit 40 and reflected on a living body. Details of the ranging will be described later.

The ranging-light irradiating unit 40 is to irradiate a ranging light as described previously. This ranging light is reflected on a living body, and enters the imaging device 10 to be imaged. That is, the imaging device 10 images the ranging light of the ranging-light irradiating unit 40 reflected on the living body. As described previously, because the ranging light is light that is concentrated at one point, the imaging device 10 generates images at plural points corresponding to ranging lights of the plural ranging-light irradiating units 40. Hereinafter, this image is referred to as ranging image. This ranging image has a different shape according to a distance to a living body. At the ranging, the ranging image generated by the imaging device 10 is output to the ranging unit 50.

The ranging unit 50 is to measure a distance to a living body. This ranging unit 50 controls the ranging-light irradiating unit 40 to irradiate a ranging light to a living body. Thereafter, a distance to the living body is detected based on the ranging image output from the imaging device 10. Details of the ranging performed by the ranging unit 50 will be describe later. The detected distance to the living body is output to the image selecting unit 60.

The image selecting unit 60 is to select a living body image from among images generated by the imaging device 10 based on a distance to a living body. As described previously, at the time of generating a living body image, the imaging device 10 outputs images including two living body images that are formed by the first lens 21 and the second lens 22, respectively. The image selecting unit 60 selects one out of these.

As described previously, the first lens 21 and the second lens 22 have different ranges of focus, and differ in range of distance to a living body enabling authentication. The image selecting unit 60 compares a distance to a living body with the respective ranges of the first lens 21 and the second lens 22 enabling authentication. Thus, the image selecting unit 60 can select a lens that focuses on a living body at a position of a measured distance out of the first lens 21 and the second lens 22, and can select a living body image that is imaged by the lens. Next, the image selecting unit 60 generates a new living body image by performing cutting out of the living body image selected from among images output from the imaging device 10. The generated living body image is output to the authenticating unit 200. The image selecting unit 60 in the drawing outputs a vein image as the living body image. The living body image output from the image selecting unit 60 corresponds to an output of the imaging apparatus 100.

The control unit 70 is to control the entire imaging apparatus 100. This control unit 70 outputs a control signal to the imaging device 10, the light irradiating unit 30, and the like, to control these units.

Out of the imaging apparatus 100, the ranging unit 50, the image selecting unit 60, and the control unit 70 can be constituted of dedicated hardware using a field programmable gate array (FPGA) or the like. Moreover, they can be constituted of a microcontroller with firmware.

The authenticating unit 200 is to perform personal authentication based on a living body image output from the imaging apparatus 100. A result of the authentication is output to a higher-level apparatus, or the like. The authenticating unit 200 in the drawing is an illustrating of an example of being arranged in the authentication apparatus 1, but other configurations can be adopted also. For example, a configuration in which the authenticating unit 200 is arranged in an external server or the like, and communicates a living body image and the like with the imaging apparatus 100 through a network can be adopted also.

Ranging

FIGS. 5A to 5D are diagrams illustrating an example of distance measurement according to an embodiment of the present disclosure. The drawing is a diagram illustrating an example of ranging by the ranging unit 50.

Figure 5A:
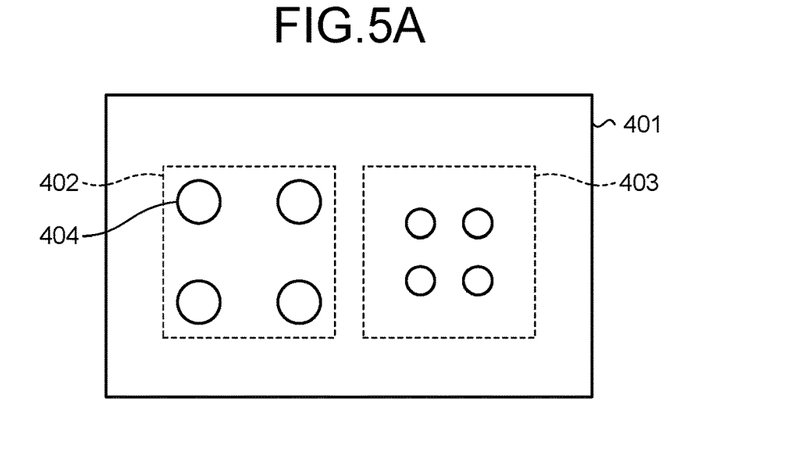
FIG. 5A is a diagram illustrating an example of distance measurement according to an embodiment of the present disclosure.

FIG. 5A illustrates an image 401 that is generated by the imaging device 10. This image 401 includes a ranging image 402 that is imaged through the first lens 21 and a ranging image 403 that is imaged through the second lens 22. The ranging images 402 and 403 include an image 404 in a point shape output from the ranging-light irradiating unit 40. As explained in FIG. 2, because the imaging apparatus 100 includes four ranging-light irradiating units 40, four images 404 are formed in each of the ranging images 402 and 403. The shapes of the ranging images 402 and 403 change according to a distance to a living body. This is explained with the ranging image 402 as an example.

Figure 5B:
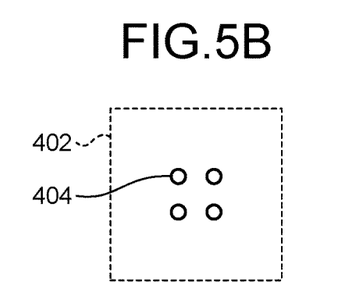
FIG. 5B is a diagram illustrating an example of the distance measurement according to an embodiment of the present disclosure.
Figure 5C:
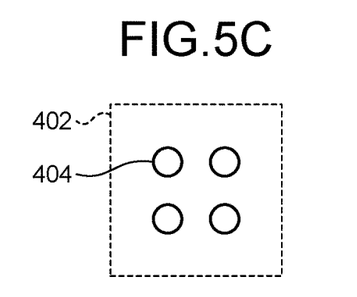
FIG. 5C is a diagram illustrating an example of the distance measurement according to an embodiment of the present disclosure.
Figure 5D:
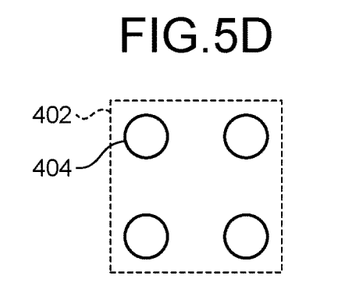
FIG. 5D is a diagram illustrating an example of the distance measurement according to an embodiment of the present disclosure.

FIGS. 5B to 5D are diagrams illustrating the ranging image 402 when a distance to a living body changes. FIG. 5B, FIG. 5C, and FIG. 5D represent a case in which a distance to the living body is far, intermediate, and close, sequentially. As illustrated, as the living body is distant farther, the four images 404 of the ranging image 402 have a smaller shape. Therefore, by measuring the size of the ranging images 402 and 403, an area occupied by the four images 404, and the like, the distance to the living body can be detected.

To perform the ranging as described, calibration of the ranging unit 50 is performed at the time of product shipment or the like. Specifically, in each of the first lens 21 and the second lens 22, ranging data that indicates a relationship between a distance to a living body and a size of a living body image is acquired. This ranging data is stored in the ranging unit 50. After the product shipment, the ranging unit 50 can calculate a distance to a living body based on the ranging data stored therein.

Selection of Living Body Image

Figure 6:
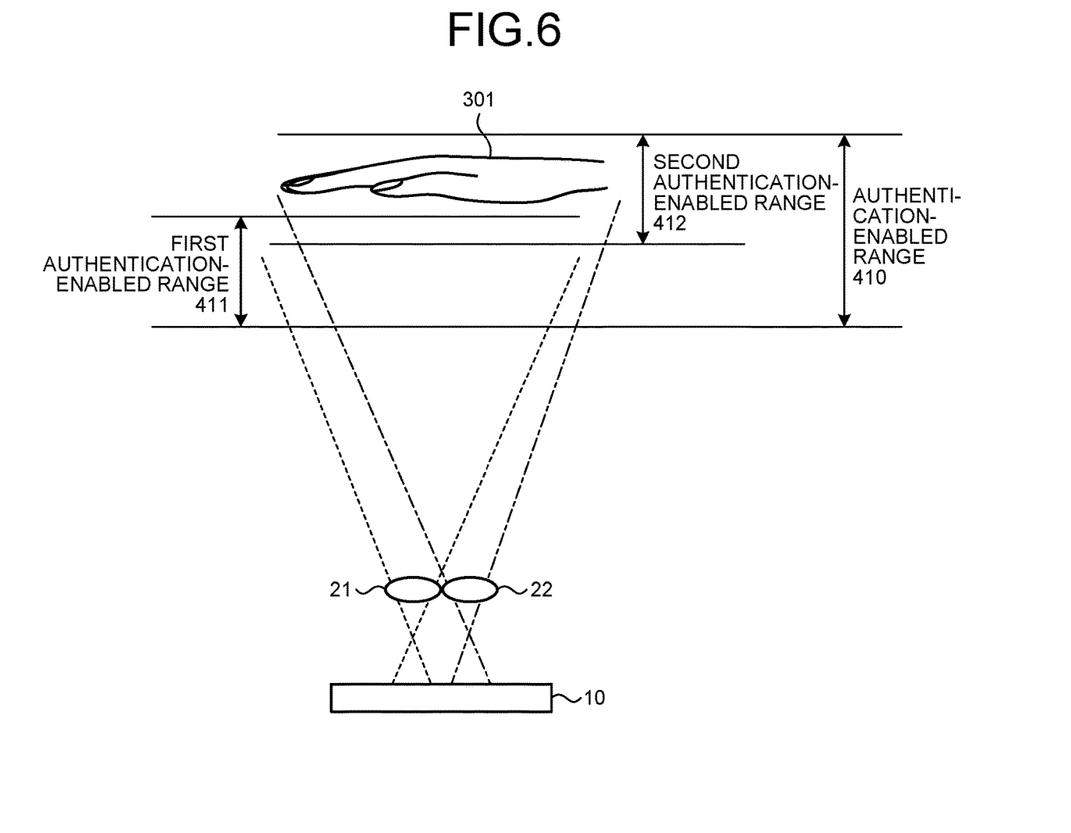
FIG. 6 is a diagram illustrating an example of selection of a living body image according to an embodiment of the present disclosure.

FIG. 6 is a diagram illustrating an example of selection of a living body image according to an embodiment of the present disclosure. The drawing is a diagram illustrating an example of selection of a living body image by the image selecting unit 60. In the drawing, a first authentication-enabled range 411 represents a range in which authentication is possible with a living body image that is captured through the first lens 21. Moreover, a second authentication-enabled range 412 represents a range in which authentication is possible with a living body image that is captured through the second lens 22. The first authentication-enabled range 411 based on the first lens 21 having a short focal length is set to a region closer to the imaging device 10 (near side), and the second authentication-enabled range 412 based on the second lens 22 is set to a farther region (far side).

Furthermore, as illustrated in the drawing, the first authentication-enabled range 411 and the second authentication-enabled range 412 have a overlapped region. Specifically, it is configured such that a lower limit distance of the second authentication-enabled range 412 is closer to the imaging device 10 than an upper limit distance of the first authentication-enabled range 411. Thus, an entire authentication-enabled range 410 in the imaging apparatus 100 can be expanded to a range between the lower limit distance of the first authentication-enabled range 411 and the upper limit distance of the second authentication-enabled range 412. Within the distance range, seamless authentication is possible. As described, by adopting the first lens 21 and the second lens 22 having focal lengths to provide an overlapped range in the respective authentication-enabled ranges, a distance range of an authenticable living body can be expanded. Hereinafter, upper limit distance and lower limit distance are briefly denoted as upper limit and lower limit.

For the authentication-enabled ranges based on the first lens 21 and the second lens 22, ranges can be determined based on a size of a generated living body image, other than the ranges of focus of the respective lenses. When a distance to a living body is far, an image of a living body projected on the light receiving surface 11 of the imaging device 10 is small, and a distortion of a vein image or the like occur. Therefore, extraction of biological information necessary for authentication is difficult. On the other hand, when a distance to a living body is close, a projected image of a living body becomes larger than the light receiving surface 11. In this case, an imaged living body image is to be an image missing a part of the biological information. Therefore, a range of distance to a living body in which a living body image in a size necessary for authentication can be acquired may be set to the authentication-enabled range. In this case also, the authentication-enabled range based on the first lens 21 having a short focal length is to be a region closer to the imaging device 10 than the authentication-enabled range based on the second lens 22.

The image selecting unit 60 determines which of the first authentication-enabled range 411 and the second authentication-enabled range 412 a living body is included in based on a distance output from the ranging unit 50, and selects either one of living body images captured through the first lens 21 and the second lens 22. Thereafter, the image selecting unit 60 performs cut-out processing of a living body image from the image output from the imaging device 10. The cut-out of the living body image can be performed by image processing.

When a distance to a living body is included in an overlapping region of the first authentication-enabled range 411 and the second authentication-enabled range 412, a lens closer to the center of the respective authentication-enabled range can be selected.

To perform the selection of a living body image as described, calibration of the image selecting unit 60 is performed at the time of product shipment. Specifically, in each of the first lens 21 and the second lens 22, an upper limit, a center, and a lower limit of the authentication-enabled range are acquired and are stored in the image selecting unit 60. After the product shipment, the image selecting unit 60 can select a living body image based on the stored upper limit value and the like.

Imaging Method of Living Body Image

Figure 7:
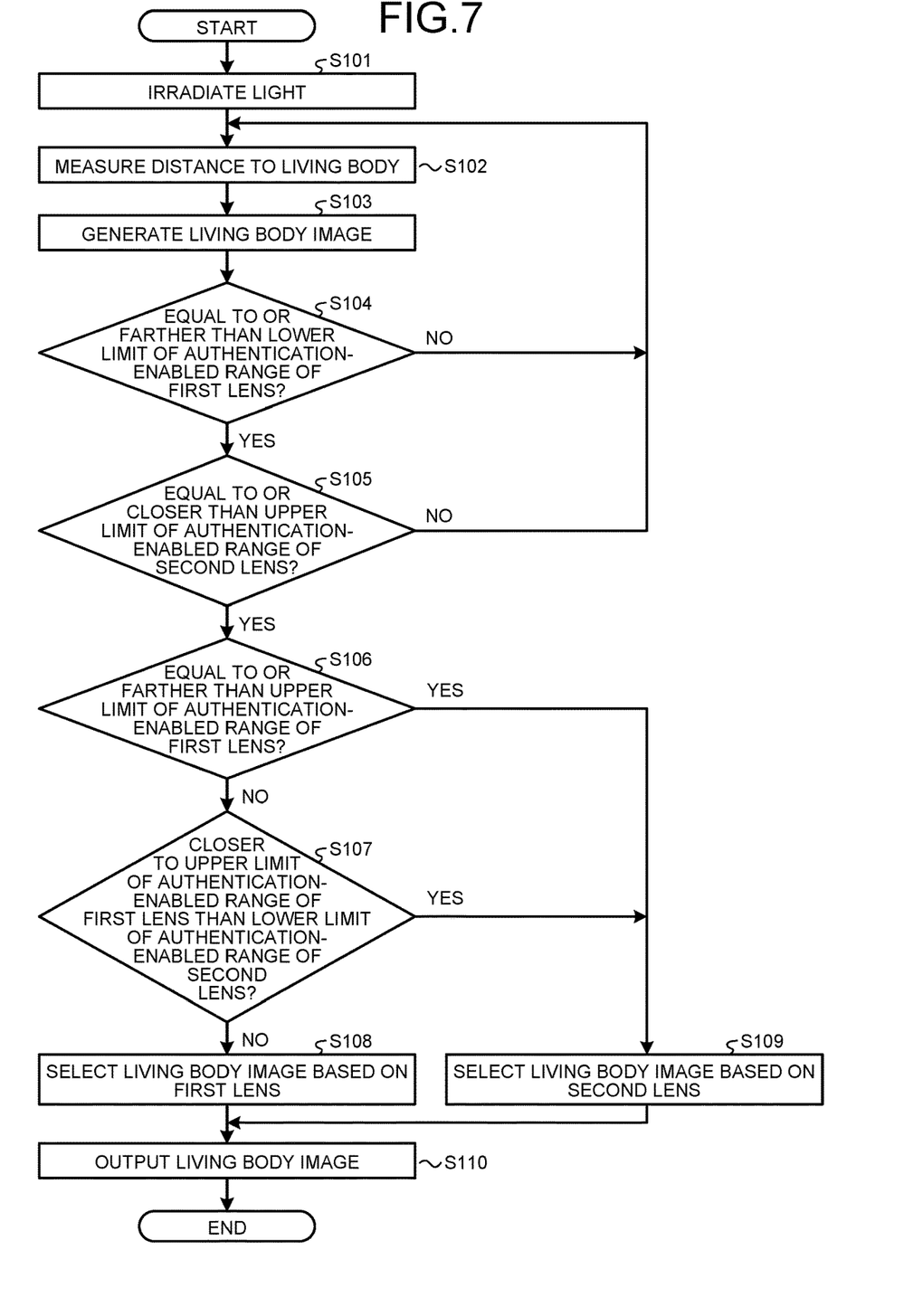
FIG. 7 is a diagram illustrating an example of an imaging method of a living body image according to an embodiment of the present disclosure.

FIG. 7 is a diagram illustrating an example of an imaging method of a living body according to an embodiment of the present disclosure. By using the drawing, an example of the imaging method of a living body in the imaging apparatus 100 will be explained. First, light is irradiated to a living body (step S101). This can be performed by controlling the light irradiating unit 30 by the control unit 70 to irradiate light. Next, a distance to a living body is measured (step S102). This can be performed by detecting a distance by the ranging unit 50 based on a ranging image generated by the imaging device 10 after the ranging light is irradiated by controlling the ranging-light irradiating unit 40 by the ranging unit 50. Next, a living body image is generated (step S103). This can be performed by controlling the imaging device 10 by the control unit 70 to capture an image. At this time, the imaging device 10 captures an image of the living body through the first lens 21 and the second lens 22.

Next, it is determined whether a distance to the living body is equal to or farther than the lower limit of the authentication-enabled range of the first lens 21 (the first authentication-enabled range 411 in FIG. 6) (step S104). As a result, when the distance to the living body is not equal to or farther than the lower limit of the authentication-enabled range of the first lens 21 (step S104: NO), the processing from step S102 is performed again. On the other hand, when the distance to the living body is farther than the lower limit of the authentication-enabled range of the first lens 21 (step S104: YES), it proceeds to processing at step S105.

At step S105, the image selecting unit 60 determines whether the distance to the living body is equal to or closer than the upper limit of the authentication-enabled range of the second lens 22 (the second authentication-enabled range 412 in FIG. 6) (step S105).

As a result, when the distance to the living body is not equal to or closer than the upper limit of the authentication-enabled range of the second lens 22 (step S105: NO), the processing from step S102 is performed again. On the other hand, when the distance to the living body is equal to or closer than the authentication-enabled range of the second lens 22 (step S105: YES), it proceeds to processing at step S106.

At step S106, the image selecting unit 60 determines whether the distance to the living body is equal to or farther than the upper limit of the authentication-enabled range of the first lens 21 (step S106). As a result, when the distance to the living body is equal to or farther than the upper limit of the authentication-enabled range of the first lens 21 (step S106: YES), it proceeds to processing at step S109. On the other hand, when the distance to the living body is not equal to or farther than the upper limit of the authentication-enabled range of the first lens 21 (step S106: NO), it proceeds to processing at step S107.

At step S107, the image selecting unit 60 determines which of the lower limit of the authentication-enabled range of the second lens 22 and the upper limit of the authentication-enabled range of the first lens 21 the distance to the living body is closer to. As a result, when the distance to the living body is closer to the upper limit of the authentication-enabled range of the first lens 21 than to the lower limit of the authentication-enabled range of the second lens 22 (step S107: YES), it proceeds to processing at step S109. On the other hand, when the distance to the living body is not closer to the upper limit of the authentication-enabled range of the first lens 21 than the lower limit of the authentication-enabled range of the second lens 22 (step S107: NO), it proceeds to processing at step S108.

At step S108, the image selecting unit 60 selects a living body image based on the first lens 21 (step S108). Thereafter, it proceeds to processing at step S110.

At step S109, the image selecting unit 60 selects a living body image based on the second lens 22 (step S109). Thereafter, it proceeds to processing at step S110.

At step S110, the image selecting unit 60 performs output of the selected living body image (step S110).

By the processing described above, imaging of a living body by the imaging apparatus 100 can be performed. The order of the processing of distance measurement to a living body (step S102) and the processing of generation of a living body image (step S103) can be switched.

Effect of Embodiment

As described, the imaging apparatus 100 of the embodiment of the present disclosure performs imaging of a living body through the first lens 21 and the second lens 22, generates an image including the two living body images based on the respective lenses, and selects these living body images based on a measured distance to the living body. Thus, a range of distance to the living body in which authentication of the living body is possible can be expanded, and the usability can be improved.

Moreover, compared to a method of expanding a range of distance to a living body in which authentication is enabled by using a lens having a focus adjustment mechanism, the configuration of the imaging apparatus 100 can be simplified. This is because the focus adjustment mechanism and the like can be omitted.

Furthermore, because the first lens 21 and the second lens 22 form a living body image on the imaging device 10 at the same time, plural living body images can be generated with a single unit of the imaging device 10. The number of the imaging device 10 can be reduced, and the configuration of the imaging apparatus 100 can be simplified.

The configuration of the imaging apparatus 100 is not limited to this example. For example, a configuration in which a living body image is acquired by using three or more lenses may be adopted. In this case, the range of distance to a living body in which authentication is enabled can further be expanded.

Moreover, a configuration in which an imaging device is arranged for each of lenses arranged in the imaging apparatus 100 can also be adopted. In this case, the image selecting unit 60 can select an imaging device paired with a lens based on a distance to a living body, and can acquire a living body image that is output from the selected imaging device.

Moreover, for measurement of a distance to a living body, other methods, for example, Time-of-Flight using the imaging device 10 can be adopted.

Furthermore, the imaging apparatus 100 can be used for a living body other than hand, or for generation a living body image other than vein image. For example, the imaging apparatus 100 can be used for generation of a vein image of a finger, an image of a face, an image of an iris, and the like.

According to an imaging apparatus and an imaging method according to the present disclosure, a range of distance to a living body in which a living body image can be captured can be extended.

Effects described in the present specification are only one example and are not limited, and other effects may be produced.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An imaging apparatus comprising:
   a light irradiator that irradiates light to a living body;
   a ranging unit that measures a distance to the living body;
   a plurality of lenses having respectively different focal lengths at which an image of a living body to which the light is irradiated is formed;
   an imaging device that generates a plurality of living body images that are images of the living body by respectively capturing an image of the living body through the lenses; and
   an image selecting unit that selects one out of the living body images based on the measured distance to the living body.

2. The imaging apparatus according to claim 1, wherein the living body is hand, and
   the living body image is a vein image.

3. The imaging apparatus according to claim 1, wherein lenses form an image of the living body by reflected light that is the irradiated light reflected on the living body.

4. The imaging apparatus according to claim 1, wherein the ranging unit measures a distance to the living body based on an image of light irradiated on the living body.

5. The imaging apparatus according to claim 1, wherein the lenses respectively form an image of the living body on one of the imaging devices,
   the imaging device generates an image including the living body images captured through the lenses, and
   the image selecting unit selects one out of the living body images included in the generated image.

6. The imaging apparatus according to claim 1, wherein a plurality of the imaging devices corresponding to each of the lenses are included, and the image selecting unit selects one out of the living body images that are generated respectively by the imaging devices.

7. An imaging method comprising:

irradiating light to a living body;

measuring a distance to the living body;

generating a plurality of living body images that are images of the living body by capturing an image of the living body through plurality of lenses having respective different focal lengths at which an image of a living body to which the light is irradiated is formed; and selecting one out of the living body images based on the measured distance to the living body.

\* \* \* \* \*